Brown & Ashworth.
Shuttle.
N°43,252. Patented Jun. 21, 1864.
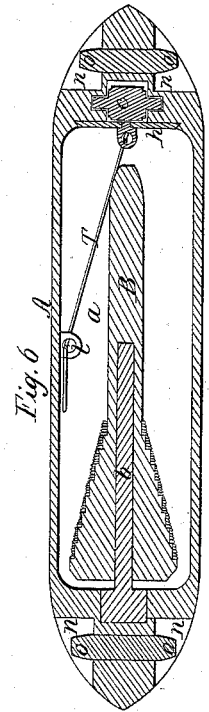
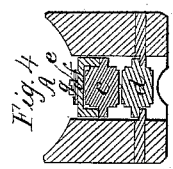
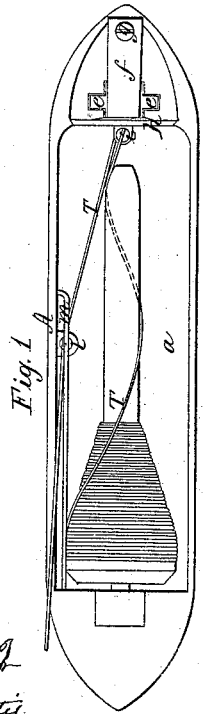
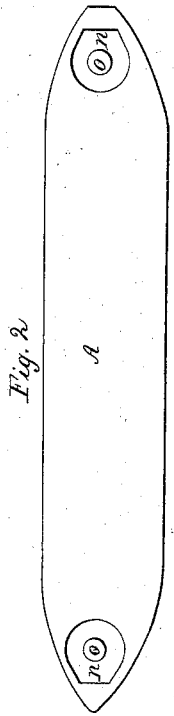
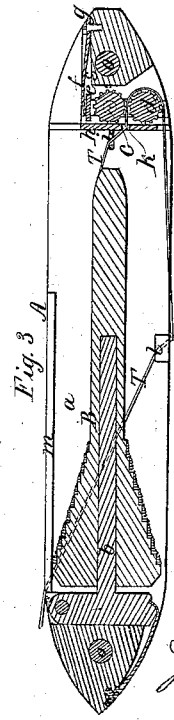
Witnesses
F. P. Hale Jr.
Frederick Curtis
Inventor
Darius C. Brown
Jno Ashworth
by their atty
R. H. Eddy

UNITED STATES PATENT OFFICE.

DARIUS CHASE BROWN AND JOHN ASHWORTH, OF LOWELL, MASSACHUSETTS, ASSIGNORS TO DARIUS C. BROWN, OF SAME PLACE.

IMPROVEMENT IN SHUTTLES FOR MACHINES FOR KNITTING LOOM-HARNESS.

Specification forming part of Letters Patent No. 43,252, dated June 21, 1864.

*To all whom it may concern:*

Be it known that we, DARIUS CHASE BROWN and JOHN ASHWORTH, residents of Lowell, in the county of Middlesex and State of Massachusetts, have invented an Improved Shuttle for Machines for Knitting Weaver's or Loom Harness; and we do hereby declare the said invention to be fully described in the following specification and represented in the accompanying drawings, of which—

Figure 1 is a top view; Fig. 2, a side elevation, and Fig. 3 a longitudinal section of the said shuttle. Fig. 4 is a transverse section of it, taken through its fluted rollers.

The drawings also exhibit the shuttle, spool, and the thread as it runs therefrom through and out of the shuttle.

The nature of our improvements is to be found, first, in making the shuttle with fluted delivery-rollers controlled by a pressure-spring; second, in making the shuttle with a guard-plate arranged between the spool and the delivery-rollers, and for the purposes as hereinafter specified; third, in the combination and arrangement of an elongated auxiliary eye or thread guide arranged against the side of the spool-chamber and extending to one end of it and disposed with respect to an eye at the lower part of and in the middle of such side, as hereinafter described, with the said last-mentioned eye, and an eye and a pair of fluted delivery-rollers arranged in advance of the spool or in the shuttle, as hereinafter explained; fourth, in making each nose of the shuttle with recesses and studs, arranged together substantially as hereinafter explained.

The objects or purposes of the fluted delivery-rollers are not only to insure even delivery of the thread or twine, but to prevent the twine from becoming twisted, as it is liable to be when a spring-presser alone is used in connection with the surface or notch through which the thread may be delivered.

The objects or purposes of the guard-plate are not only the prevention of the loop of the twine or thread (as such twine or thread will be delivered from the spool in a looped or loose state) from being caught by the delivery-rollers, but to afford a support for the guides through which the twine is led to the delivery-rollers.

The objects or purposes of the elongated eye are not only to cause the shuttle to measure off less twine than it would provided the twine went through a circular eye arranged at the middle of the upper part of the side of the shuttle-chamber, but to so guide the twine as to prevent it from being caught on the spool or otherwise getting out of place during the movements of the shuttle.

The object of the recesses of the nose of the shuttle is to prevent a loop of the twine while the shuttle may be in the act of passing through such loop from becoming caught on either or both of the studs of such recesses, the recesses being so made as to allow the pinchers, which operate the shuttle, to lay hold of the studs.

In the drawings, A denotes the shuttle as not only constructed with an elongated spool-chamber, $a$, but as provided with a spindle, $b$, for holding a spool or bobbin, B. The shuttle is suitably chambered for reception of two delivery-rollers, $c\ d$, shown in side view in Fig. 5. These rollers are fluted or grooved longitudinally of their curved surfaces—one being placed over the other—and provided with a yoke, $e$, which straddles it and its journals and is pressed downward by a spring, $f$, furnished with a screw, $g$, for regulating the amount of pressure of the spring on the said yoke, and in consequence thereof the draft or tension of the twine leading from the delivery-rollers. In order that the spring may be placed on the yoke by the screw, the seat $s$, on which the front part of the spring rests, is an inclined plane, as shown in Fig. 3. In rear of these rollers, or between them and the spool, there is a transverse plate, $h$, which I term the "guard-plate." It not only has an eye, $i$, projecting from it, but a hole, $k$, made through it. The twine T from the bobbin or spool goes through the said eye and hole, and from thence passes between the two delivery-rollers, thence rearward through an eye, $l$, in the lower part and at the middle of one side of the chamber $a$. From the eye $l$ the twine passes upward through an elongated slot or auxiliary eye, $m$, arranged within the chamber $a$ and at its upper edge and extending to the rear end of it, as also somewhat in front of the eye $l$, as shown in the drawings. In each nose of the shuttle are two recesses, $n\ n$, which open laterally as well as longitudinally out of the nose, they being arranged in the shuttle, as shown in the drawings. In each of these recesses is a stud, o, which projects from the shuttle and into the recess, but not beyond it, the same being as shown in Fig. 6, which is a horizontal section of the shuttle. The pinchers, by which the shuttle is drawn through the eyes of twine during the formation of the harness, enter these recesses and lay hold of the studs, the recesses being to prevent the twine from catching on the stud. The auxiliary or elongated eye $m$, arranged in the shuttle and combined with the eye $l$, as described, causes the shuttle to measure off the right amount of thread at each throw of it, and were it not for this such a result would not take place, as the thread given out would be too long, as has been found in practice.

The employment of fluted delivery-rollers in the shuttle combined with a spring-pressure, produces a new and useful effect—that is, the rollers prevent the twisting of the twine, which results when a spring-presser is employed, as the friction against the spring so acts on the twist of the twine as to press it forward and condense it so as to cause the twine to kink more or less, which is a serious objection, as it will cause the eyes of the harness to stand out of their proper positions. These fluted rollers are also advantageous in other respects. Plain or unfluted rollers will not answer the purpose, as they allow the twine to slip more or less, and thus do not effect an even tension of it, which is necessary in the making of the harness.

Having thus stated the nature and objects of our invention or improvements and described them in their construction and arrangement, we would remark that what we claim is as follows:

1. The shuttle as made with the fluted delivery-rollers controlled by a spring, arranged to press one roller toward the other, the whole being as explained.

2. The shuttle as made with the guard-plate $h$, arranged between or combined with the spool and the fluted delivery-rollers, and carrying the guide eye and hole, substantially as described.

3. The combination and arrangement of the elongated auxiliary eye $m$, arranged within the shuttle-chamber and with respect to the eye $l$ thereof, substantially as specified, with such eye $l$, and an eye, $i$, and a pair of fluted delivery-rollers, $c$ $d$, disposed in advance of the spool, as hereinbefore set forth.

4. The shuttle, as made with the recesses and studs, arranged together and with respect to the curved ends or noses of the shuttles, substantially as represented and described.

DARIUS C. BROWN.
JOHN ASHWORTH.

Witnesses:
R. H. EDDY,
F. P. HALE, JR.